(12) United States Patent
Evans et al.

(10) Patent No.: US 10,487,804 B2
(45) Date of Patent: Nov. 26, 2019

(54) SYSTEMS AND METHODS FOR VALIDATING WIND FARM PERFORMANCE IMPROVEMENTS

(71) Applicant: General Electric Company, Schenectady, NY (US)

(72) Inventors: Scott Charles Evans, Burnt Hills, NY (US); Zhanpan Zhang, Niskayuna, NY (US); Peter Alan Gregg, Niskayuna, NY (US); Kevin Wayne Kinzie, Spartanburg, SC (US); William Arthur Flodder, Greenville, SC (US); Mark Nicolaas Jonkhof, Deventer (NL); Megan Michela Wilson, Greenville, SC (US)

(73) Assignee: General Electric Company, Schenectady, NY (US)

(*) Notice: Subject to any disclaimer, the term of this patent is extended or adjusted under 35 U.S.C. 154(b) by 787 days.

(21) Appl. No.: 14/644,743

(22) Filed: Mar. 11, 2015

(65) Prior Publication Data

US 2016/0265513 A1    Sep. 15, 2016

(51) Int. Cl.
  *F03D 13/30* (2016.01)
  *F03D 7/04* (2006.01)
  (Continued)

(52) U.S. Cl.
  CPC .............. *F03D 13/30* (2016.05); *F03D 7/048* (2013.01); *F03D 9/257* (2017.02); *F03D 17/00* (2016.05);
  (Continued)

(58) Field of Classification Search
  CPC .... F03D 9/0024; F03D 9/0072; F03D 9/0076; F03D 9/0028; F03D 9/00284;
  (Continued)

(56) References Cited

U.S. PATENT DOCUMENTS 6,512,966 B2    1/2003  Lof et al.
7,071,579 B2 *  7/2006  Erdman ................ F03D 7/0284
                                                           290/44

(Continued)

FOREIGN PATENT DOCUMENTS

CN    103020462 A    4/2013
WO    2014046355 A1   3/2014

OTHER PUBLICATIONS

Article—Towards Wind Farm Performance Optimization through Empirical Models, Aerospace Conference, 2014 IEEE, Mar. 1-8, 2014, Evans et al., pp. 1-12.

(Continued)

*Primary Examiner* — Herve-Louis Y Assouman
(74) *Attorney, Agent, or Firm* — Dority & Manning, P.A.

(57) ABSTRACT

The present disclosure is directed to systems and methods for validating wind farm performance improvements so as to optimize wind farm performance. In one embodiment, the method includes operating, via a controller, the wind farm in a first operating mode. Another step includes collecting a first set of operating data, via a processor, during the first operating mode. A further step includes operating, via the controller, the wind farm in a second operating mode. The method also includes collecting a second set of operating data, via the processor, during the second operating mode. Next, the method includes normalizing the first and second sets of operating data based on wind speed distributions. As such, another step includes comparing, via the processor, the normalized first and second sets of operating data so as to validate one or more wind farm performance measurements.

17 Claims, 14 Drawing Sheets

(51) Int. Cl.
*F03D 17/00* (2016.01)
*F03D 9/25* (2016.01)

(52) U.S. Cl.
CPC ....... *F05B 2230/80* (2013.01); *F05B 2270/32* (2013.01); *F05B 2270/335* (2013.01); *Y02E 10/723* (2013.01); *Y02P 70/523* (2015.11)

(58) Field of Classification Search
CPC .. F03D 9/00292; F03D 9/00296; F03D 13/30; F03D 13/35
USPC .................................................. 702/102, 182
See application file for complete search history.

(56) References Cited

U.S. PATENT DOCUMENTS

| | | | |
|---|---|---|---|
| 8,849,737 | B1 | 9/2014 | Engler |
| 2006/0002792 | A1* | 1/2006 | Moroz ................. F03D 7/0204 416/1 |
| 2006/0131889 | A1* | 6/2006 | Corten ..................... F03D 1/04 290/43 |
| 2006/0132994 | A1* | 6/2006 | Delmerico .............. F03D 7/028 361/20 |
| 2008/0086281 | A1 | 4/2008 | Santos |
| 2009/0099702 | A1 | 4/2009 | Vyas et al. |
| 2009/0299780 | A1 | 12/2009 | Sarkar et al. |
| 2010/0076614 | A1* | 3/2010 | Nies ....................... F03D 17/00 700/287 |
| 2010/0152905 | A1 | 6/2010 | Kusiak |
| 2011/0020122 | A1 | 1/2011 | Parthasarathy et al. |
| 2011/0049883 | A1 | 3/2011 | Hatch et al. |
| 2011/0106680 | A1 | 5/2011 | Vittal et al. |
| 2011/0145277 | A1* | 6/2011 | Gadre .................... F03D 17/00 707/769 |
| 2011/0270450 | A1* | 11/2011 | Gujjar ................... G06Q 10/00 700/287 |
| 2012/0029712 | A1* | 2/2012 | Parikh .................... G01W 1/10 700/287 |
| 2012/0083933 | A1 | 4/2012 | Subbu et al. |
| 2012/0143537 | A1 | 6/2012 | Nielsen |
| 2012/0271593 | A1* | 10/2012 | Uluyol ................... F03D 7/048 702/179 |
| 2013/0166082 | A1 | 6/2013 | Ambekar et al. |
| 2015/0198144 | A1 | 7/2015 | Park et al. |

OTHER PUBLICATIONS

Abstract Only—Anticipatory Control of Wind Turbines with Data-Driven Predictive Models, Energy Conversion, IEEE Transactions, Sep. 2009, Kusiak et al., vol. 24, Issue 3, pp. 766-774.
Abstract Only—Fuzzy Modeling Techniques and Artificial Neural Networks to Estimate Annual Energy Output of a Wind Turbine, Renewable Energy, 2010, Jafarian et al., vol. 35, Issue 9, pp. 2008-2014.
Co-Pending U.S. Appl. No. 14/493,464, filed Sep. 23, 2014.
Banakar et al., "Impacts at Wind Power Minute-to-Minute Variations on Power System Operation", Power Systems, IEEE Transactions on, pp. 150-160, vol. No. 23, Issue No. 01, Feb. 2008.

* cited by examiner

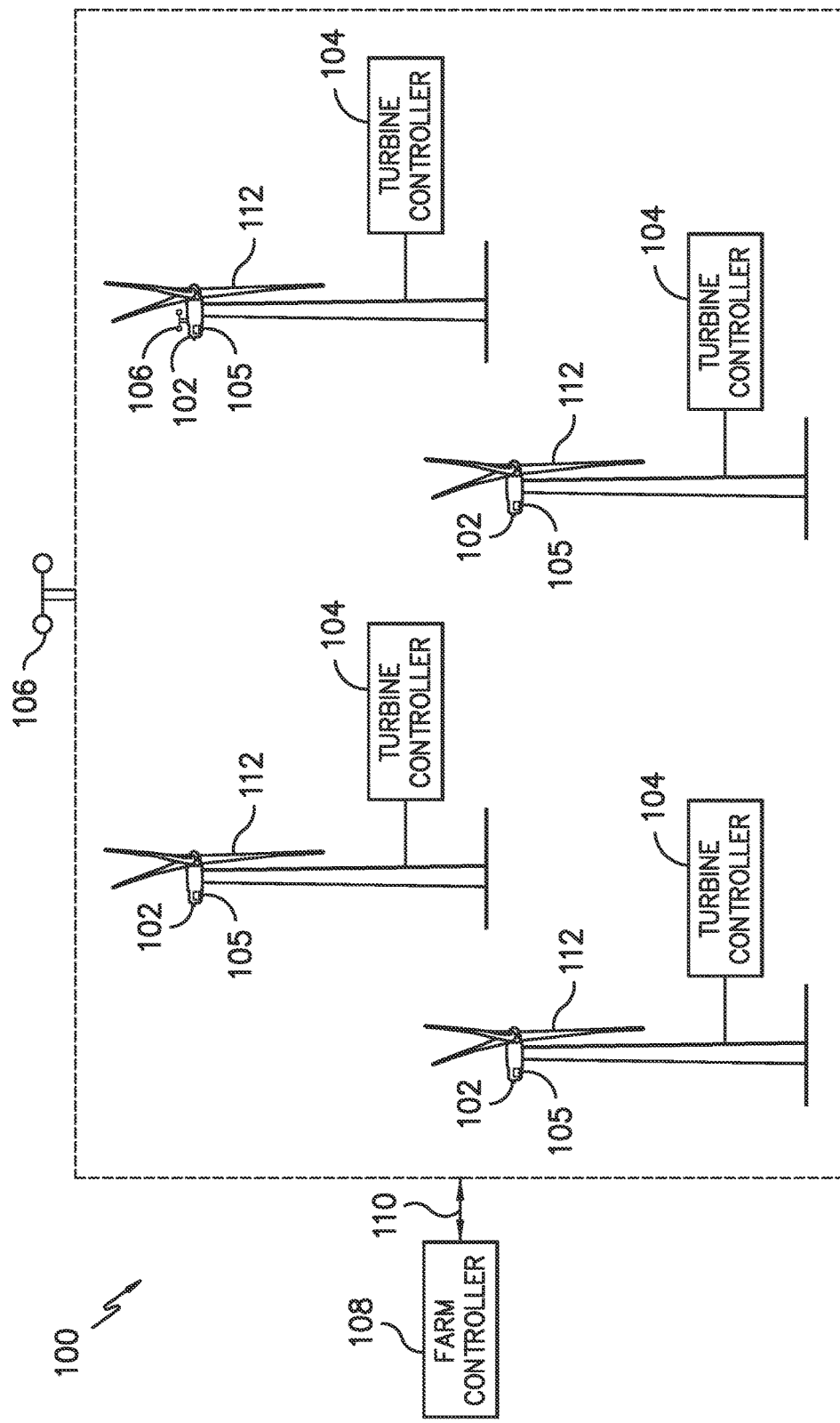
FIG. -1-

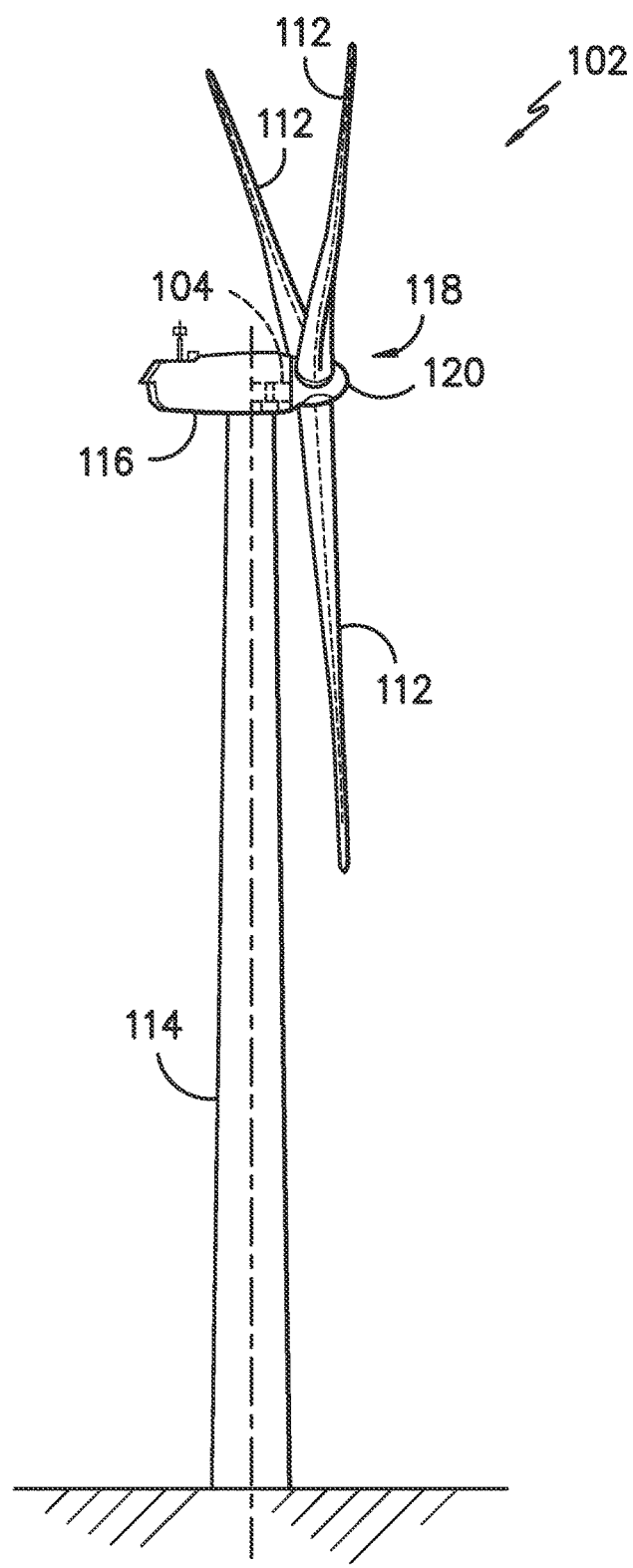
FIG. -2-

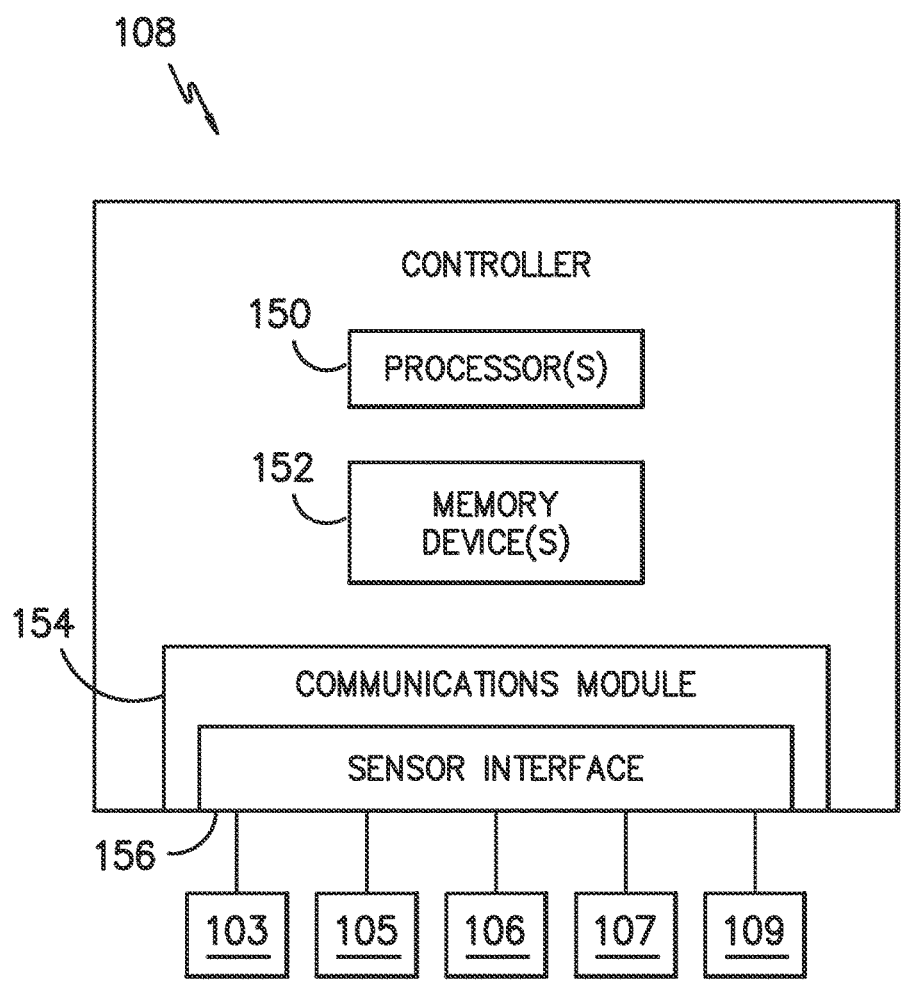
FIG. -3-

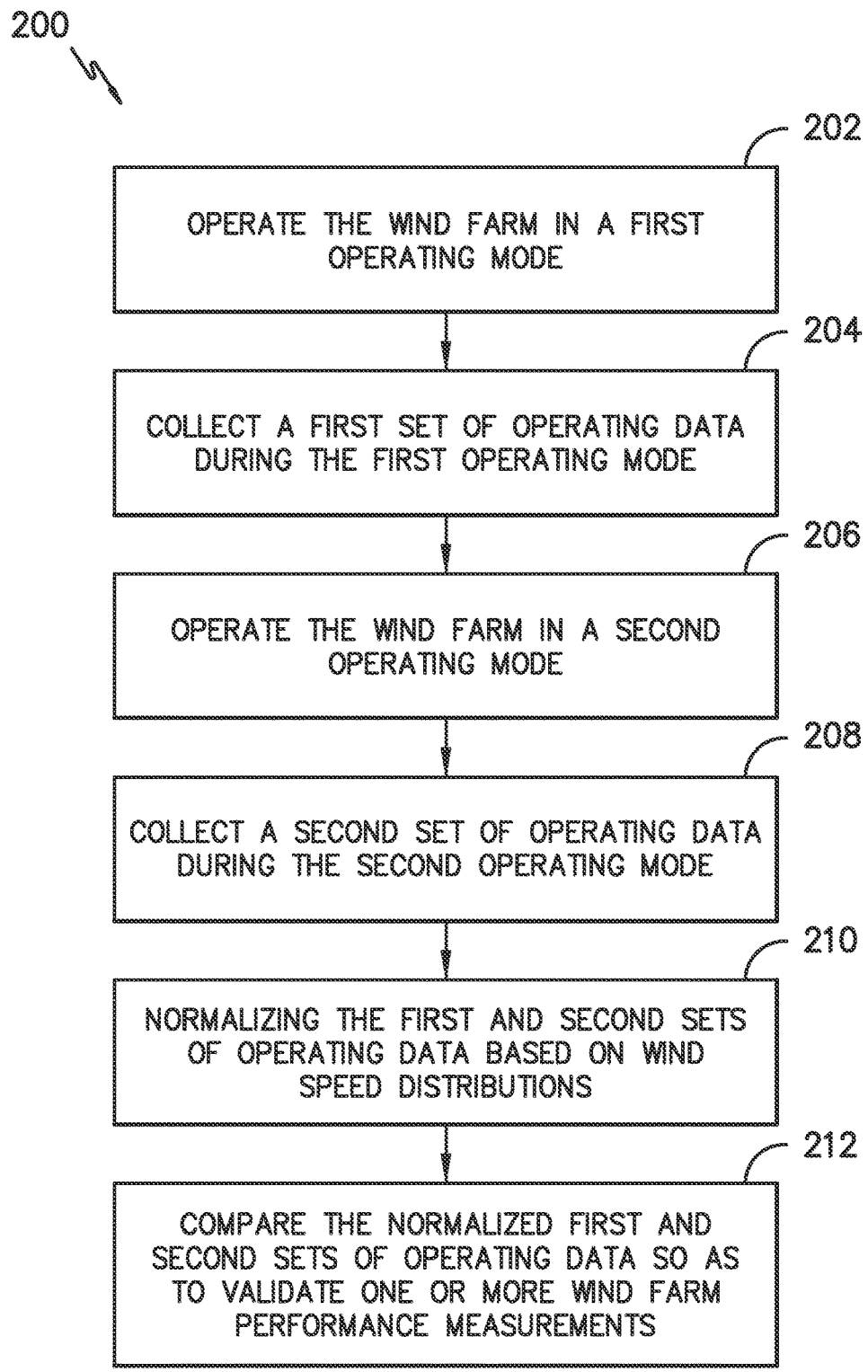
FIG. -4-

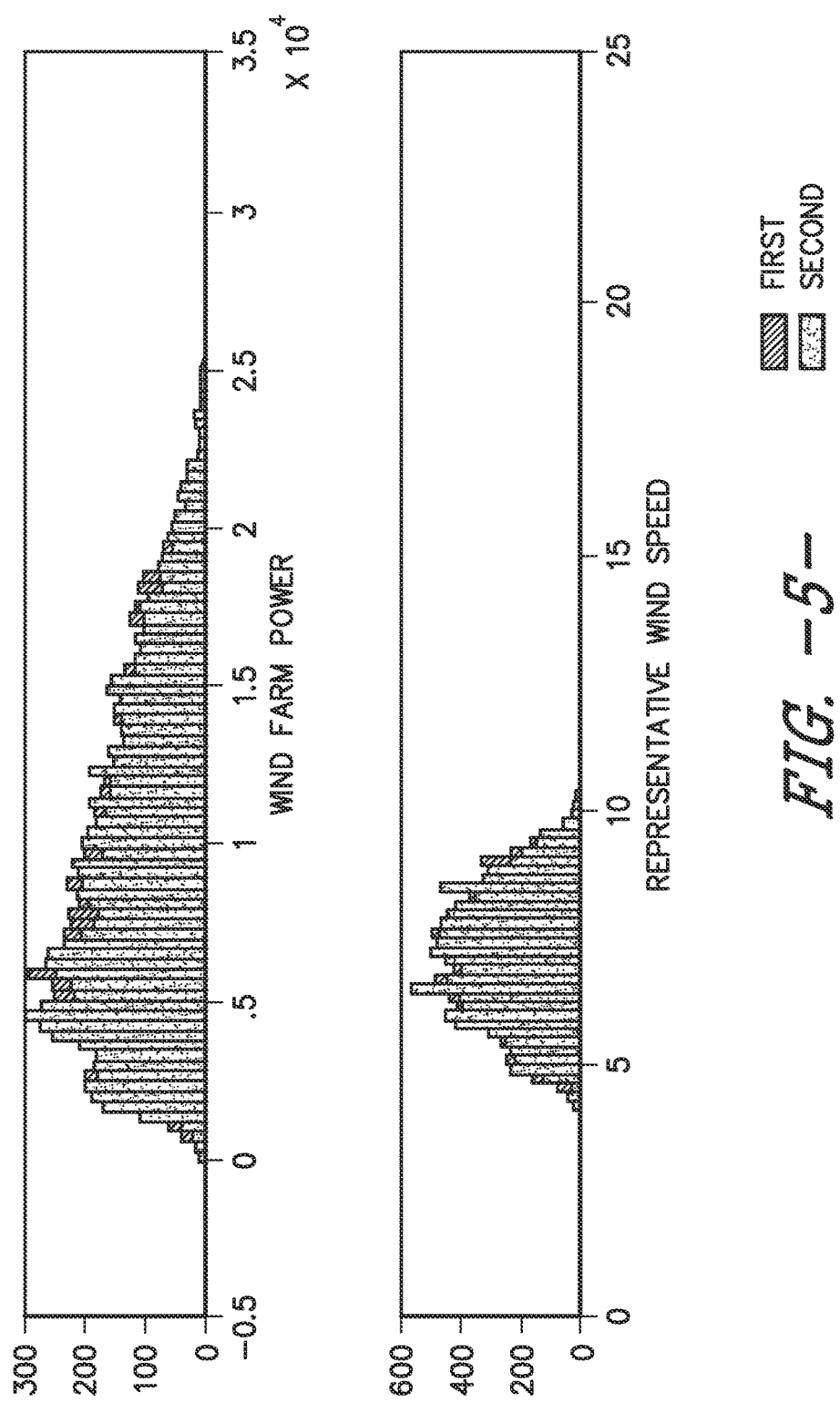
FIG. -5-

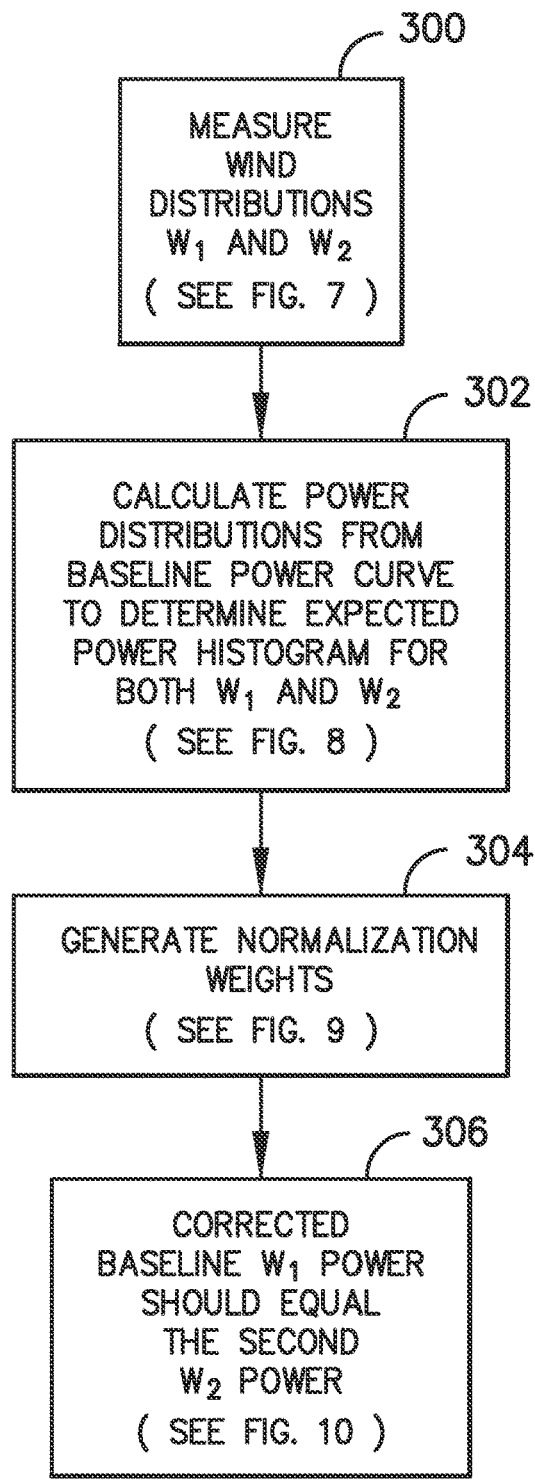
FIG. -6-

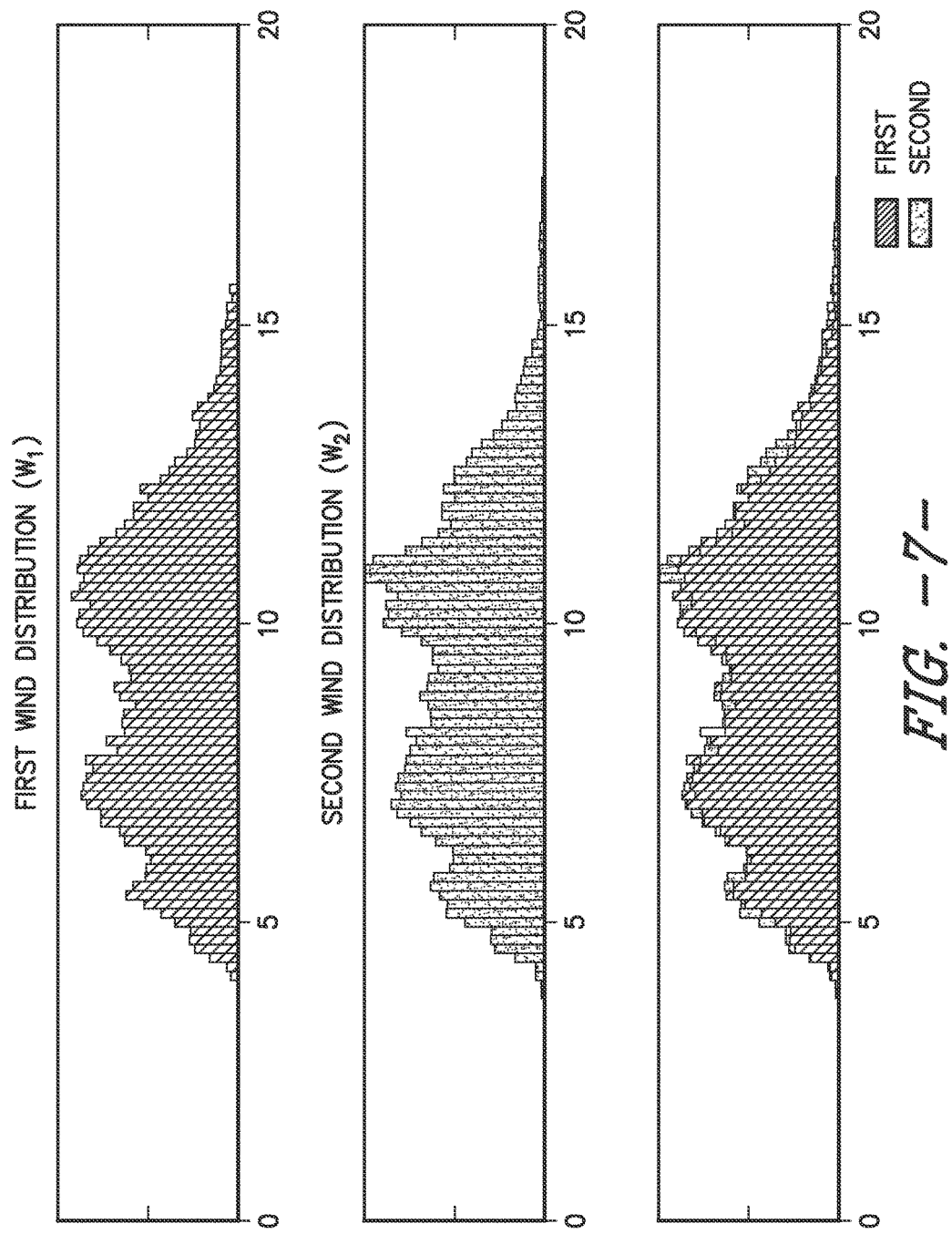
FIG. -7-

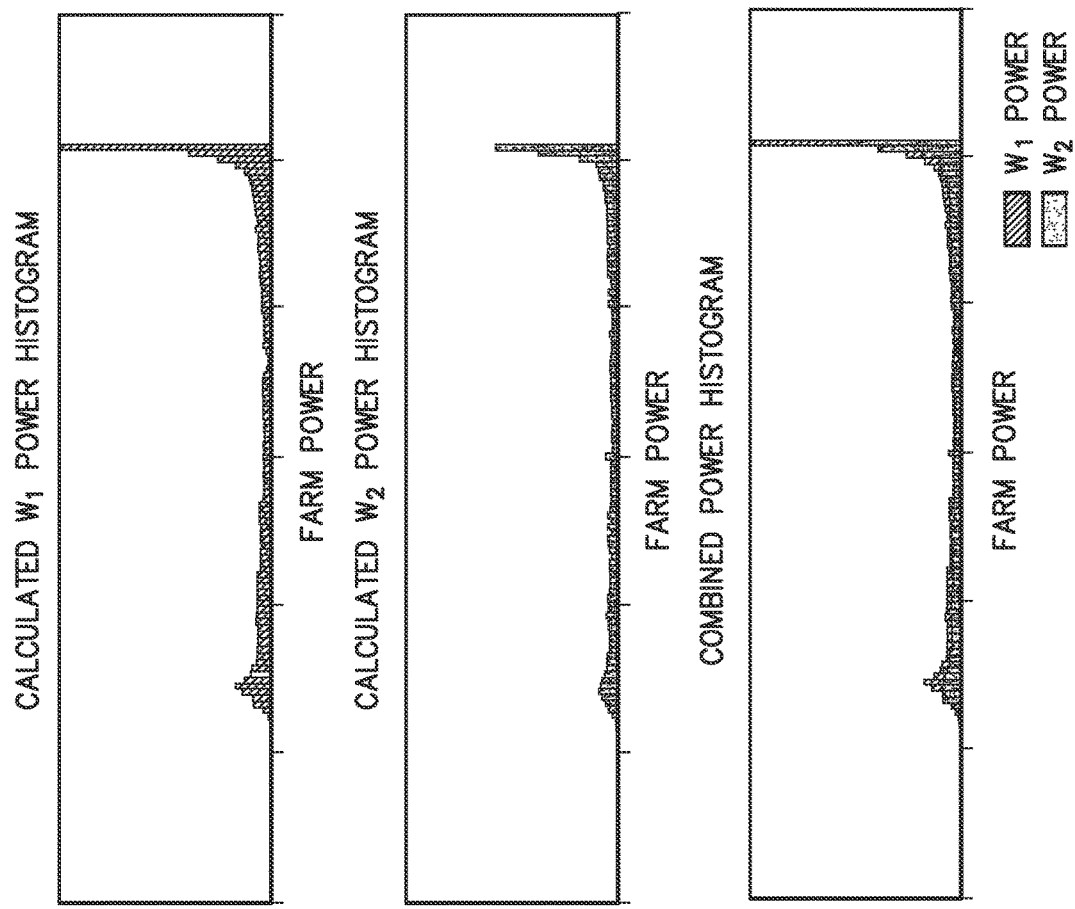
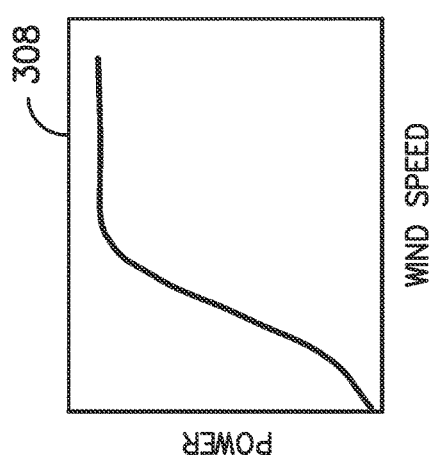
FIG. -8-

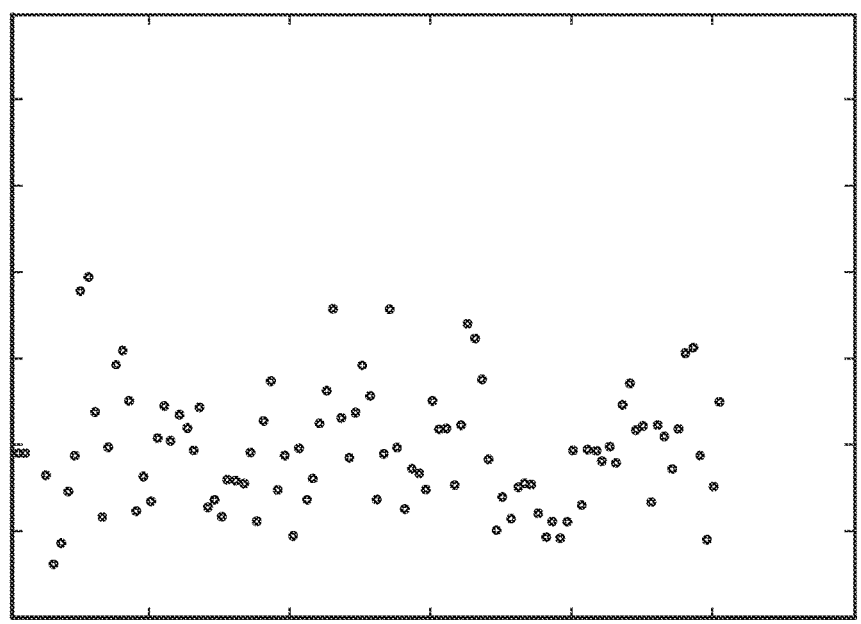
CALCULATED HISTOGRAM WEIGHTS
FIG. -9-

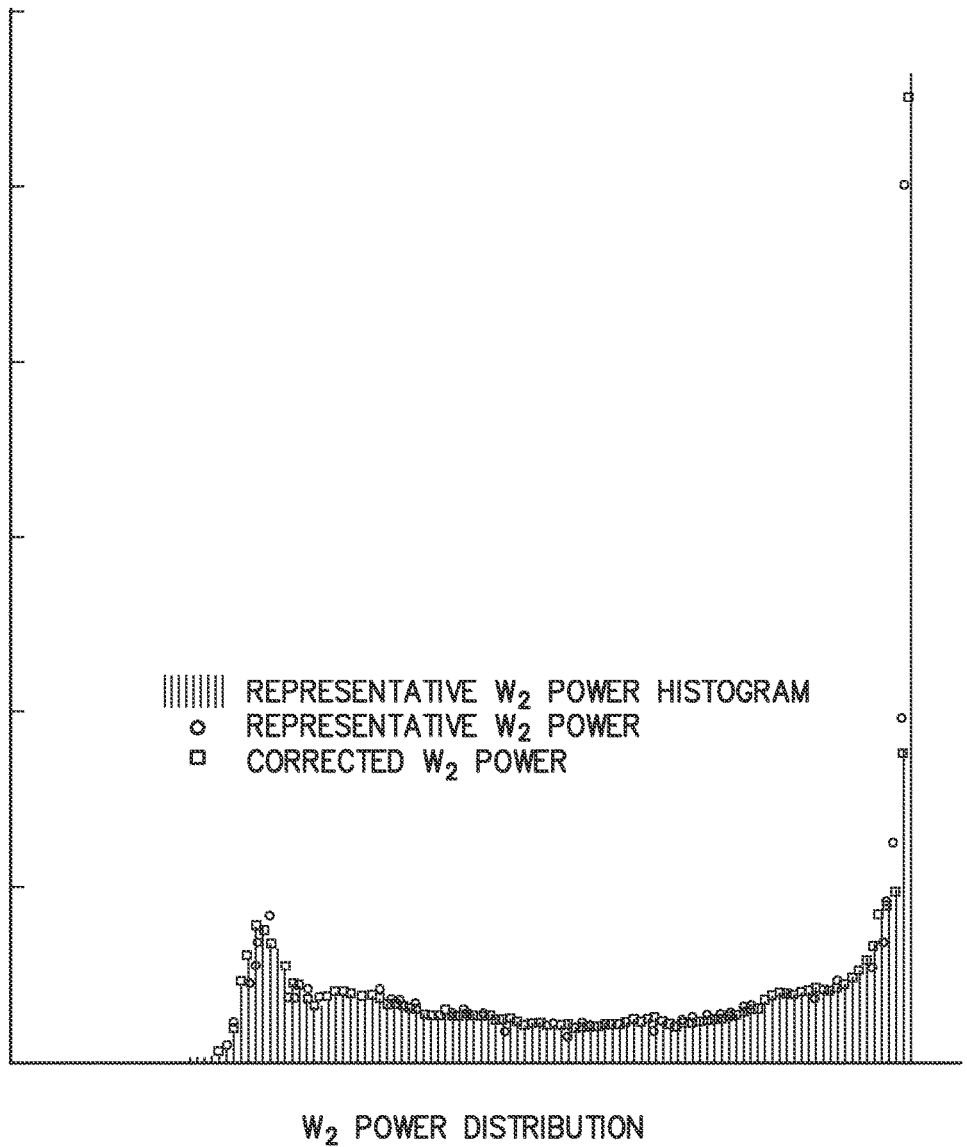
FIG. -10-

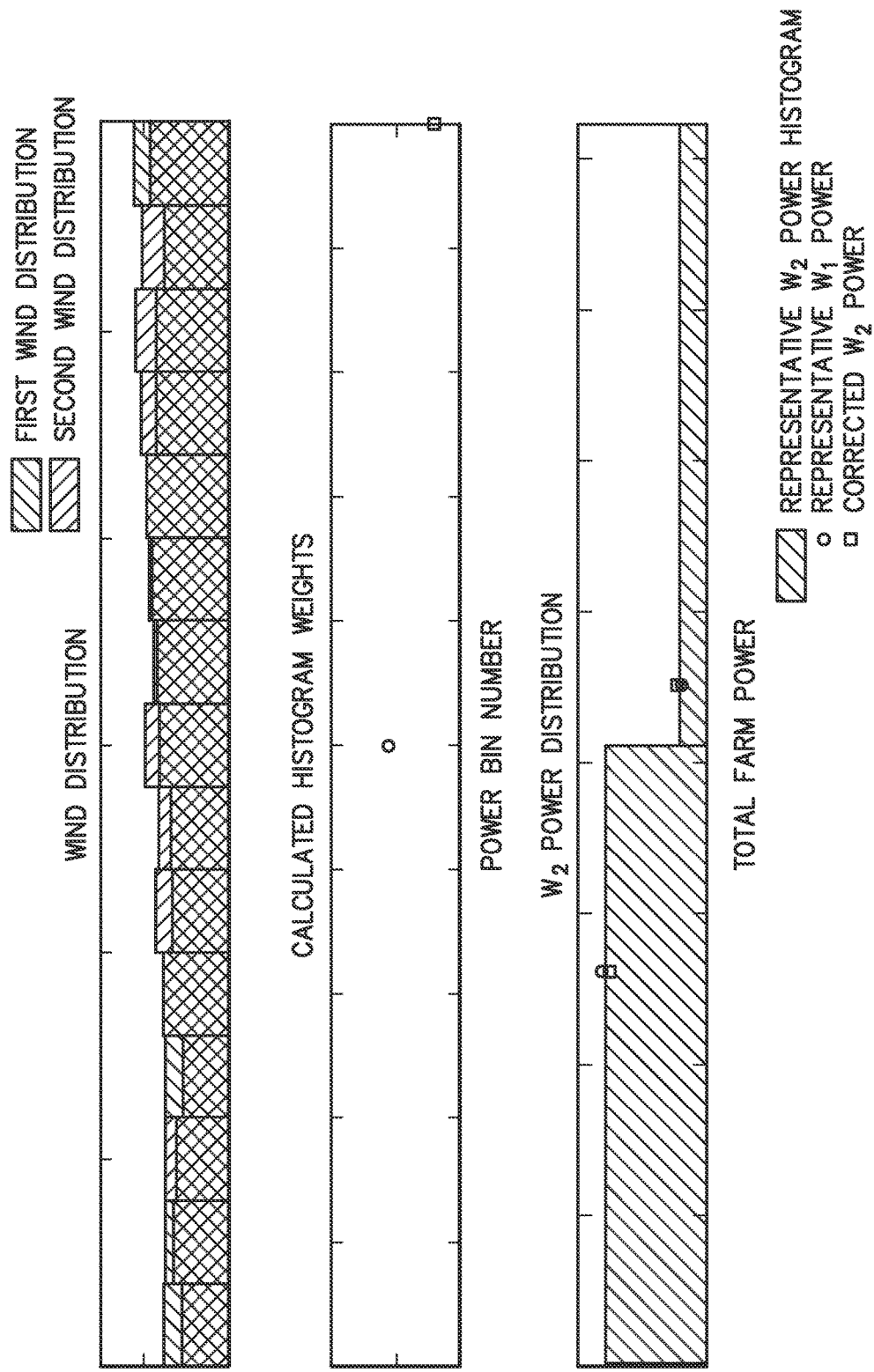
FIG. -11-

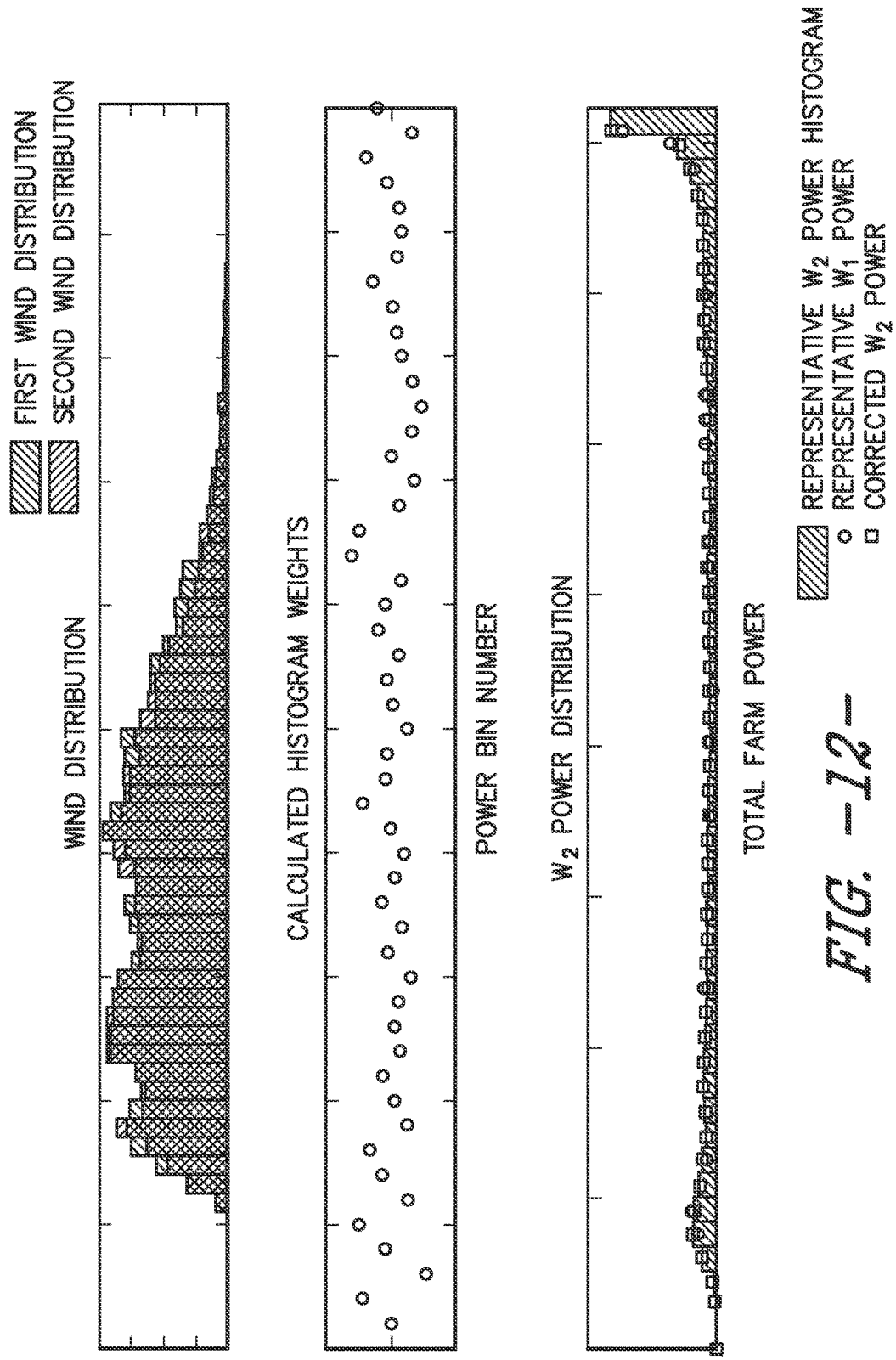
FIG. -12-

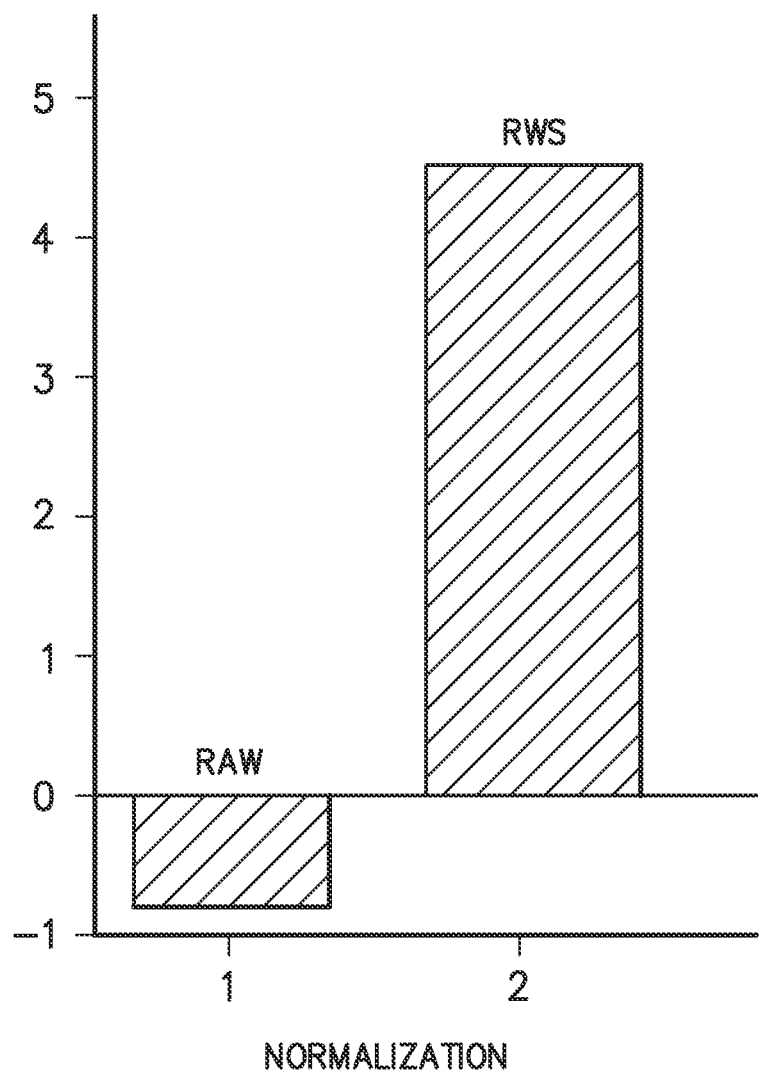
FIG. -13-

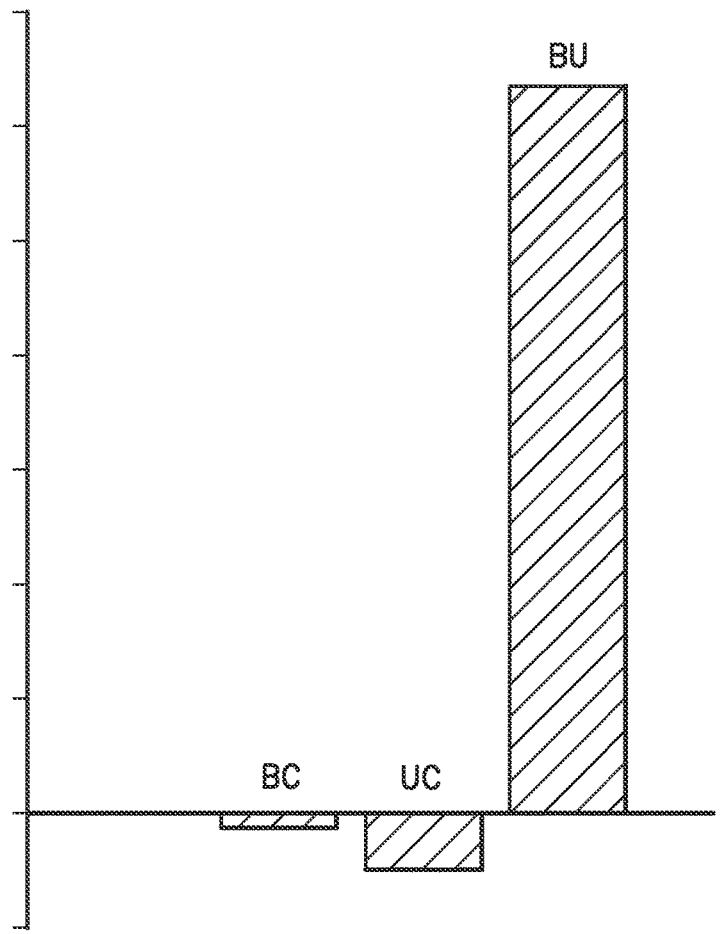
FIG. -14-

SYSTEMS AND METHODS FOR VALIDATING WIND FARM PERFORMANCE IMPROVEMENTS

FIELD OF THE INVENTION

The present disclosure relates generally to wind farms and, more particularly, to systems and methods for validating wind farm performance improvements, e.g. power output, as a result of installing one or more upgrades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm may also be provided. The correlation of meteorological data with power output provides the empirical determination of a "power curve" for the individual wind turbines.

Typically, in a wind farm, each wind turbine attempts to maximize its own power output while maintaining its fatigue loads within desirable limits. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

Often, while maximizing the power output of a single wind turbine, neighboring turbines may be negatively impacted. For example, downwind turbines may experience large wake effects caused by an upwind turbine. Wake effects include reduction in wind speed and increased wind turbulence downwind from a wind turbine typically caused by the conventional operation of upwind turbines. Because of these wake effects, downwind turbines receive wind at a lower speed, drastically affecting their power output (as power output is proportional to wind speed). Moreover, wind turbulence negatively affects the fatigue loads placed on the downwind turbines, and thereby negatively affects their life (as life is proportional to fatigue loads). Consequently, maximum efficiency of a few wind turbines may lead to sub-optimal power output, performance, or longevity of other wind turbines in the wind farm. Thus, modern control technologies attempt to optimize the wind farm power output rather than the power outputs of each individual wind turbine.

Accordingly, there are many products, features, and/or upgrades available for wind turbines and/or wind farms so as to increase power output or annual energy production (AEP) of the wind farm. Once an upgrade has been installed, it is advantageous to efficiently determine various wind turbine performance improvements so as to verify the benefit of the upgrade. For example, one typical method for assessing wind turbine performance improvements is to baseline power against wind speed, for example, as assessed by a met mast anemometer, a the turbine nacelle anemometer, and/or various sensors. Even when nacelle anemometers are calibrated correctly, however, individual wind power curve methods are not able to discern the benefit of upgrades, such as wake minimization technologies, that can create more wind for the farm to use.

In view of the aforementioned issues, still another approach for assessing wind turbine performance measurements is to baseline performance against a control turbine in close proximity to a turbine of interest. Such an approach, however, is subject to the availability of the control turbine and further inaccuracies due to reliance on a single, more distant sensor. Thus, it is difficult to show the benefit of upgrades to individual turbines.

Accordingly, there is a need for improved systems and methods for evaluating wind farm performance improvements that address the aforementioned issues. Thus, the present disclosure is directed to systems and methods for evaluating wind farm performance.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for evaluating wind farm performance. The method includes operating, via a controller, the wind farm in a first operating mode. Another step includes collecting a first set of operating data, via a processor, during the first operating mode. A further step includes operating, via the controller, the wind farm in a second operating mode. The method also includes collecting a second set of operating data, via the processor, during the second operating mode. Next, the method includes normalizing the first and second sets of operating data based on wind speed distributions. As such, another step includes comparing, via the processor, the normalized first and second sets of operating data so as to validate one or more wind farm performance measurements.

In another aspect, the present disclosure is directed to a method for validating wind farm performance measurements after one or more upgrades have been installed. The method includes operating, via a controller, the wind farm in a baseline operating mode. Another step includes generating, via a processor, a baseline graphical distribution of performance of the wind farm. A further step includes providing one or more upgrades to at least one of the wind turbines in the wind farm. The method also includes operating the wind farm in an upgraded operating mode and generating, via the processor, an upgraded graphical distribution of performance of the wind farm. Next, the method includes comparing, via the processor, the baseline graphical distribution and the upgraded graphical distribution.

In yet another aspect, the present disclosure is directed to a system for validating one or more wind farm performance measurements produced by one or more upgrades. The system includes a plurality of sensors configured to measure operating data from one or more wind turbines in a wind farm and a controller configured to perform one or more operations. The operations include operating the wind farm in a first operating mode, collecting a first set of operating data during the first operating mode, operating the wind farm in a second operating mode, collecting a second set of operating data during the second operating mode, normalizing the first and second sets of operating data based on wind speed distributions, and comparing the normalized first and second sets of operating data so as to validate one or more wind farm performance measurements.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind farm according to the present disclosure;

FIG. 2 illustrates a perspective view of one embodiment of a wind turbine according to the present disclosure;

FIG. 3 illustrates a block diagram of one embodiment of a controller of a wind turbine and/or or wind farm according to the present disclosure;

FIG. 4 illustrates a flow diagram of one embodiment of a method for evaluating wind farm performance according to the present disclosure;

FIG. 5 illustrates various graphs of total farm power output generated during a first operating mode and a second operating mode, as well as the corresponding representative wind speed during each of the respective operating modes according to the present disclosure;

FIG. 6 illustrates a flow diagram of another embodiment for evaluating wind farm performance according to the present disclosure;

FIG. 7 illustrates various graphs of first and second wind distributions according to one embodiment of the present disclosure;

FIG. 8 illustrates various graphs of a power curve and power histograms, respectively, according to one embodiment of the present disclosure;

FIG. 9 illustrates a graph of calculated normalization weights according to one embodiment of the present disclosure;

FIG. 10 illustrates a power distribution graph according to one embodiment of the present disclosure;

FIG. 11 illustrates various graphs of one embodiment for evaluating wind farm performance using two-bin normalization;

FIG. 12 illustrates various graphs of one embodiment for evaluating wind farm performance using multiple-bin normalization;

FIG. 13 illustrates a bar chart of the power change from raw power and normalized power using a representative wind speed according to the present disclosure; and FIG. 14 illustrates another bar chart of the power change for a baseline control, an upgraded control, and a comparison between the baseline and upgraded operating modes according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for evaluating wind farm performance. For example, in one embodiment, the system is configured to validate wind farm performance measurements, i.e. power output, in response to one or more upgrades installed within the wind farm so as to optimize wind farm performance. In various embodiments, the controller of the system operates the wind farm in a first or baseline operating mode. During the baseline operating mode, the controller generates a baseline graphical distribution of performance of the wind farm. After one or more upgrades are provided to at least one of the wind turbines in the wind farm, the controller then operates the wind farm in an upgraded operating mode. The controller then generates an upgraded graphical distribution of performance of the wind farm for comparison with the baseline graphical distribution. Accordingly, the controller then compares the baseline and upgraded graphical distributions so as to validate performance improvements (e.g. improved power output) produced by the one or more upgrades.

In another embodiment, the present disclosure is directed to a method for measuring the wind farm performance between different operating modes. For example, the controller is configured to operate the wind farm in a first operating mode and collect a first set of operating data during such mode. The controller then operates the wind farm in a second operating mode and collects a second set of operating data during the second mode. As such, the controller is configured to compare the data generated between the two modes where the wind distributions are different. Direct comparison between the time periods is not possible unless the wind distribution between the two time periods is the same. Accordingly, the present method provides a process to normalize or correct between the two data sets for variance in the wind distribution that would otherwise cause unequal wind farm power observations.

It should be understood that the upgrades may include any suitable upgrade now known or later developed in the art, including but not limited to rotor blade chord extensions, software upgrades, controls upgrades, hardware upgrades, wake controls, noise reduced operation, aerodynamic upgrades, blade tip extensions, vortex generators, winglets, pressure side add-on devices, or similar. Accordingly, the farm controller is configured to validate wind farm performance improvements (such as improvements in wind farm power) that occur in response to at least one upgrade being installed.

The present disclosure has many advantages not present in the prior art. For example, the present disclosure provides improved accuracy of estimated upgrade improvements by avoiding the need to use wind speed or correct anemometer readings. Further, the present disclosure utilizes a large amount of data to determine the power produced during baseline and upgraded conditions and compares the results to provide a highly accurate and robust system. Thus, accuracy of wind farm performance improvements may be improved and associated costs and times may be reduced.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 1 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm controller 108. Moreover, in one embodiment, the farm controller 108 may be coupled to the turbine controllers 104 through a network 110 to facilitate communication between the various wind farm components. The wind turbines 102 may also include one or more sensors 105 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Referring now to FIG. 3, there is illustrated a block diagram of one embodiment of suitable components that may be included within the farm controller 108 and/or the turbine controller(s) 104 in accordance with aspects of the present disclosure. As shown, the controller 108 may include one or more processor(s) 150 and associated memory device(s) 152 configured to perform a variety of computer-implemented functions (e.g., performing the methods, steps, calculations and the like and storing relevant data as disclosed herein). Additionally, the controller 108 may also include a communications module 154 to facilitate communications between the controller 108 and the various components of the wind turbine 102. Further, the communications module 154 may include a sensor interface 156 (e.g., one or more analog-to-digital converters) to permit signals transmitted from one or more sensors 103, 105, 106, 107, 109 (such as the sensors described herein) to be converted into signals that can be understood and processed by the processors 150. It should be appreciated that the sensors 103, 105, 106, 107, 109 may be communicatively coupled to the communications module 154 using any suitable means. For example, as shown, the sensors 103, 105, 106, 107, 109 are coupled to the sensor interface 156 via a wired connection. However, in other embodiments, the sensors 103, 105, 106, 107, 109 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller 108 to perform various functions as described herein. Moreover, the network 110 that couples the farm controller 108, the turbine controllers 104, and the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

Referring now to FIG. 4, a flow diagram of a method 200 that may be implemented by the farm controller 108 for evaluating one or more wind farm performance measurements according to the present disclosure is illustrated. In certain embodiments, the performance measurements include a power output of the wind farm 100. More specifically, as shown at 202, the farm controller 108 is configured to operate the wind farm in a first or baseline operating mode. Thus, at 204, the controller 108 is configured to measure or collect a first set of operating data from the sensors 103, 105, 106, 107, 109 during operation of the wind farm 100 in the first operating mode. At 206, the farm controller 108 is configured to operate the wind farm 100 in a second operating mode. The second operating mode may be an upgraded operating mode or simply a different time period than the first operating mode. As used herein, the term "baseline" generally refers to operation of the wind farm 100 wherein the wind turbines 102 do not contain any upgrades or at a minimum, the upgrade that is being tested for performance improvements. Similarly, the term "upgraded" as used herein generally refers to operation of the wind farm 100 wherein at least one of the wind turbines 102 contains at least one upgrade.

More specifically, where the second operating mode corresponds to an upgraded operating mode, one or more upgrades are provided to at least one of the wind turbines 102 in the wind farm 100 after operation in the first operating mode. The upgrade(s) as described herein may include any one of or a combination of the following: rotor blade chord extensions, software upgrades, controls upgrades, hardware upgrades, wake controls, noise reduced operation, aerodynamic upgrades, blade tip extensions, vortex generators, winglets, or similar. For example, in one embodiment, the upgraded operating mode may include activating wake controls. The farm controller 108 then operates the wind farm 100 in the second operating mode. More specifically, as shown at 208, the farm controller 108 is configured to measure or collect operating data from the sensors 103, 105, 106, 107, 109 during operation of the wind farm 100 in the second operating mode.

In additional embodiments, the farm controller 108 is configured to toggle between the first and second operating modes a certain number of times or for a certain time period. More specifically, in certain embodiments, the controller 108 may toggle between the first and second operating modes, e.g. every hour or for any other suitable time period. For example, FIG. 5 illustrates various graphs of total farm power output generated by toggling between the first and second operating modes (top graph), as well as the corresponding representative wind speed during each of the respective operating modes (bottom graph). An example benefit of toggling between the different operating modes is that toggling can create easier data collection between the two operating modes under similar environmental conditions rather than collecting date between two operating modes that are run separately over long periods of time. As such, toggling can be performed over short time periods such that environmental conditions do not change significantly.

Referring now to FIG. 6, the controller 108 may generate various graphs from the first and second sets of operating data generated during the first and second operating modes so as to effectively compare the data. For example, in one embodiment, the control scheme can be applied with a single bin. As such, the controller 108 uses two wind distributions (from the first and second sets of operating data, namely $W_1$ and $W_2$) and a single reference power curve 308 to determine a single factor that can normalize a measured base power to an expected power in the second wind distribution. More specifically, as shown at 300, the controller 108 measures the first and second wind distributions $W_1$, $W_2$ and generates one or more graphical distributions (e.g. histograms) for the different operating modes. As used herein, a histogram encompasses its broad and ordinary meaning of a graphical distribution of the distribution of data. For example, in certain embodiments, the controller 108 generates wind distribution histograms for the first and second operating mode based on a representative wind speed as shown in FIG. 7. The representative wind speed is meant to encompass a measured or estimated wind speed, for example, as determined by a wind speed estimator and/or a sensor (e.g. a nacelle anemometer). Further, as shown at 302 and FIG. 8, the controller 108 calculates a power-curve-generated power distribution from the baseline power curve 308 for the first and second operating modes from the first and second wind distributions.

Since the wind speed varies during each mode, however, the actual power change can be either higher or lower than the comparison of the raw measured power. As such, it is an object of the present disclosure to normalize the power distribution curves to evaluate the actual performance difference between each of the operating modes (e.g. in response to the installed upgrade(s) such that the benefit of the upgrade can be fully realized). For example, as shown at 210 of FIG. 4, the controller 108 is configured to normalize the first and second sets of operating data collected during the first and second operating modes. More specifically, in certain embodiments, the farm controller 108 is configured to normalize the power histogram using the representative wind speed histogram so as to remove the effects of wind distribution.

The power histogram may be normalized in a variety of ways. Further, the goal of the normalization process is to enable a comparison between the wind farm or turbine power output from two different populations of measured power and wind. As such, in certain embodiments, the controller 108 normalizes the power from a first population to reflect what it would have been (given a reference power curve) if the wind farm had seen the wind distribution of the second population.

For example, as shown at 304 of FIG. 6 and FIG. 9, the controller 108 is configured to generate normalization weights based on the wind distributions. In certain embodiments, the controller 108 may filter the data as appropriate from curtailed operations, icing, and/or other abnormalities. Additional filtering by sector and or speed range may be done as desired. Further, the controller 108 calculates the expected power from the first and second operating mode wind distributions given reference power curve(s). As mentioned, a single reference power curve can be used for all data, or a separate power curve can be used for each sector as discussed below. The power curve can be fitted from the first operating mode data. For example, in one embodiment, the farm controller 108 is configured to fit power from the wind distribution for the first operating mode, $W_1$, and the measured mean power from the first operating mode, $P_1$ and/or select a reference power curve. As such, the controller 108 is configured to calculate the expected power for each operating mode using Equations (1) and (2) below:

$$P_{1CR} = \text{PowerFromWind}(W_1, \text{RefPowerCurve}) \quad \text{Equation (1)}$$

$$P_{2CR} = \text{PowerFromWind}(W_2, \text{RefPowerCurve}) \quad \text{Equation (2)}$$

Where $W_1$ is the wind distribution for the first operation mode,
$W_2$ is the wind distribution for the second operation mode,
$P_1$ is the measured mean power from the first operating mode,
$P_2$ is the measured mean power from the second operating mode,
$P_{1CR}$ is the calculated mean power from the first operating mode wind distribution and reference power curve, and $P_{2CR}$ is the calculated mean power from the second operating mode wind distribution and reference power curve.

Using the expected power calculated above, the controller 108 is configured to generate normalization weights or coefficients. In the illustrated embodiment, for example, the normalization weights can be calculated according to Equation (3) below:

$$C_{Normalization} = \frac{N_{2CR} * X_{1CR}}{N_{1CR} * X_{2CR}} \cdot \frac{SUM(N_{1CR})}{SUM(N_{1CR})} \qquad \text{Equation (3)}$$

Where
$C_{Normalization}$ is the normalization coefficient,
$N_{1CR}$ is the power histogram counts from $P_{1CR}$,
$N_{2CR}$ is the power histogram counts from $P_{2CR}$,
$X_{1CR}$ is the power histogram means from $P_{1CR}$ histogram bins, and
$X_{2CR}$ is the power histogram means from $P_{2CR}$ histogram bins.

The controller 108 can then normalize the power from the first operating mode using Equations (4) and (5) below, where Equation (5) is the equation that can be used for a single-bin case:

$$P_{1N} = N_1 * X_1 * C_{Normalization} / SUM(N_1) \qquad \text{Equation (4)}$$

$$P_{1N} = \frac{P_1 P_2^C}{P_1^C} \qquad \text{Equation (5)}$$

Where
$N_1$ is the power histogram counts from $P_1$,
$X_1$ is the power histogram means from $P_1$ histogram bins, and
$P_{1N}$ is the normalized mean power for the first operating mode.

More specifically, the farm controller 108 can then normalize or correct the first and second power histograms by multiplying the first and second power histograms by the normalization weights. Accordingly, as shown at 306, the corrected baseline $W_1$ power should equal the second $W_2$ power. For example, FIG. 10 illustrates a power distribution graph according to one embodiment of the present disclosure. It should be understood that in some cases, the wind distributions of the first and second operating modes may be identical. In such cases, the normalization coefficients may be equal to one. As such, the resulting power histograms from the first and second operating modes are effectively the same.

In additional embodiments, the controller 108 may utilize one or more transfer functions to generate the normalization coefficients that can be based on power curve measurements, estimates, calculated speed, power output based on the time spent in each operating mode, etc. For example, in one embodiment, the coefficients can be used to normalize the actual measured power histogram such that the output power from the first and second operating modes can be compared objectively.

In additional embodiments, the controller 108 may also calculate the gain using, for example, Equations (6) and (7) below, where Equation (7) is the gain equation that can be used for a single-bin case:

$$\text{Gain} = \frac{(P_2 - P_{1N}) * 100}{P_{1N}} \qquad \text{Equation (6)}$$

$$\text{Gain} = \frac{\left(P_2 - \frac{P_1 P_2^C}{P_1^C}\right) * 100}{\frac{P_1 P_2^C}{P_1^C}} \qquad \text{Equation (7)}$$

$$= \frac{(P_2 P_1^C - P_2 P_2^C) * 100}{P_1 P_2^C}$$

In still further embodiments, the controller 108 is configured to use the control scheme described herein to normalize results to an annual energy production wind distribution. More specifically, in certain embodiments, the controller 108 can normalize the annual energy production (AEP) by using a long-term Weibull distribution as the baseline wind distribution by first generating a sample set of power from the long-term wind distribution using Equation (8) below:

$$P_{CAEP} = \text{getPowerWind}(W_{AEP}, \text{RefPowerCurve}) \qquad \text{Equation (8)}$$

Where
$P_{CAEP}$ is the calculated mean power from AEP wind distribution and the reference power curve.

The calculated AEP power distribution may also be used to normalize the gain produced from the wind distribution from the second operation region $W_2$, using Equations (9) and (10) below:

$$C_{AEP} = \frac{N_{PhistBtnCounts'}^{AEP\_C} * X_{PhistBtnMeans}^{AEP\_C}}{N_{2CR'} * X_{2CR}} \cdot \frac{SUM(N_{2CR})}{SUM(N_{PhistBtnCounts}^{AEP\_C})} \qquad \text{Equation (9)}$$

$$P_{AEF} = N_{2CH'} * X_{2CH'} * C_{AEP} / SUM(N_{2CR}) \qquad \text{Equation (10)}$$

In additional embodiments, the controller 108 may use Equation (11) below, which provides a simple estimate of the calculated mean power from AEP wind distribution and the reference power curve. In other words, this equation represents the single-bin power histogram solution $$P_{AEP} = \frac{P_2}{P_2^C} P_{CAEP} \qquad \text{Equation (11)}$$

In the gain calculation, both values (e.g. the normalized P1 power ($P_{1N}$) and the measure $P_2$ power) are normalized to the wind distribution of the second operation region, therefore, the AEP gain is simply the normalized gain weighted by the factor $P_{CAEP}/P_{2C}$. Thus, the controller 108 may use Equation (12) below, to calculate the AEP gain:

$$\text{Gain}_{AEP} = \frac{(P_2 - P_1^N) * 100}{P_1^N} \cdot \frac{P_{AEP}^C}{P_2^C} \qquad \text{Equation (12)}$$

For the single-bin histogram, the controller 108 uses Equation (5) as the value for $P_{1N}$, therefore the Gain$_{AEP}$ for a single-bin case is represented by Equation (13) below:

$$Gain_{AEP} \frac{\left(P_2 - \frac{P_1 P_2^C}{P_1^C}\right) * 100}{\frac{P_1 P_2^C}{P_1^C}} \cdot \frac{P_{AEP}^C}{P_2^C} = \qquad \text{Equation (13)}$$

$$\frac{100 P_{AEP}^C (P_1^C P_2 - P_1 P_2^C)}{P_1 (P_2^C)^2}$$

Though FIG. 6 illustrates the method of the present disclosure as applied to a single bin, in further embodiments, the controller 108 may also utilize a multiple-bin normalization procedure. More specifically, in such an embodiment, the controller 108 is configured to apply a measured or reference baseline power curve for each sector to determine a sector wise gain. For example, as shown in FIGS. 11-12, various graphs illustrating multiple-bin normalization methods are illustrated. For example, FIG. 11 illustrates a two-bin normalization procedure and FIG. 12 illustrates a multiple-bin (more than two) normalization procedure. More specifically, as shown in FIG. 11, a single normalization weight is calculated, whereas for FIG. 12, a plurality of normalization weights are calculated. In addition, as shown, the representative $W_1$ power is corrected to the corrected $W_2$ power so as to generate the representative $W_2$ power histogram.

Referring now to FIG. 13, a graph illustrating one embodiment of the power change between the first operating mode and the second operation mode for various normalization procedures is illustrated. More specifically, as shown in the illustrated embodiment, the raw power change between the first and second operating modes without any normalization is about −0.74%. When the power change is normalized based on a representative wind speed (RWS), however, the actual improvement of power output can be realized. For example, as shown by the graph, the actual power improvement can be up to about 4.5%. As such, normalization of the change in power provides a more accurate overview of performance improvements in response to the upgrade(s).

Referring now to FIG. 14, a graph of the power improvement for a baseline operating control (BC), an upgraded control (UC), and a comparison between the baseline and the upgraded modes (BU) is illustrated. For the baseline and upgraded controls, namely BC and UC, the controller 108 uses approximately half of the data to generate a first power distribution and the second half of the data to generate a second power distribution. As shown, the actual or mean power improvement for each of the baseline and upgraded controls (e.g. bar graphs BC, UC) is approximately zero (or close to zero with a small error) which verifies the accuracy of the method for validating power improvements. As such, as shown for the comparison of the baseline and upgraded modes (BU), the power improvement is higher which indicates that the upgrade actually improved power, which is further confirmed by bar graphs BC and UC. Accordingly, the present disclosure effectively validates the power improvement by checking the baseline case against itself.

In additional embodiments, the farm controller 108 is configured to determine whether the operating data measured during the first and second operating modes is sufficient to obtain a desired level of validation accuracy of the performance measurements. More specifically, in certain embodiments, the farm controller 108 is configured to collect a sufficient sample size of operating data during each operating mode such that the wind speed is averaged out. As such, the power histograms can be directly generated from the data to illustrate that power is improving. In other words, the power histograms can be used directly and do not require a power curve and/or wind speed calibration approach. In further embodiments, the power histograms may be calibrated to tune other validation models.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm, the method comprising:
 installing a plurality of upgrades in the wind farm after evaluating performance of the plurality of upgrades, wherein evaluating performance of the plurality of upgrades comprises:
  operating, via a farm controller, the wind farm in a first operating mode;
  collecting a first set of operating data, via a processor of the farm controller, during the first operating mode;
  operating, via the farm controller, the wind farm in a second operating mode, wherein the second operating mode includes activating the plurality of upgrades in the wind farm;
  collecting a second set of operating data, via the processor, during the second operating mode;
  toggling between the first and second operating modes until a certain amount of operating data is collected for each of the first and second sets of operating data;
  normalizing the first and second sets of operating data based on wind speed distributions;
  comparing, via the processor, the normalized first and second sets of operating data so as to validate one or more wind farm performance measurements;
  generating a first graphical distribution of performance of the wind farm from the first set of operating data and generating a second graphical distribution of performance of the wind farm from the second set of operating data;
  wherein normalizing the first and second sets of operating data comprises multiplying the first and second graphical distributions by normalization weights;
  wherein the normalization weights ($C_{Normalization}$) are calculated based on an equation:

$$C_{Normalization} = \frac{N_{2CR} * X_{1CR}}{N_{1CR} * X_{2CR}} \cdot \frac{\text{SUM}(N_{1CR})}{\text{SUM}(N_{1CR})}$$

wherein $N_{1CR}$ and $N_{2CR}$ are power histogram counts from measured mean powers ($P_{1CR}$ and $P_{2CR}$) of first and second operation modes respectively and $X_{1CR}$ and $X_{2CR}$ are power histogram means from $P_{1CR}$ and $P_{2CR}$ histogram bins respectively, and controlling, via a farm controller, the wind farm with the plurality of upgrades installed in the wind farm after evaluating performance of the plurality of upgrades.

2. The method of claim 1, wherein the one or more wind farm performance measurements comprise a power output of the wind farm.

3. The method of claim 1, further comprising providing one or more upgrades to at least one of the wind turbines in the wind farm in between the first and second operating modes.

4. The method of claim 1, wherein the first graphical distribution and the second graphical distribution comprise a first power histogram and second power histogram, respectively.

5. The method of claim 4, wherein comparing the normalized first and second sets of operating data further comprises determining a difference between the first power histogram and the second power histogram, wherein the difference is reflective of a change in the power output.

6. The method of claim 1, wherein normalizing the first and second sets of operating data based on wind speed distributions further comprises generating a first wind distribution during the first operating mode, generating a second wind distribution during the second operating mode and normalizing the first and second graphical distributions based on the first and second wind distributions, respectively.

7. The method of claim 1, further comprising calculating an annual energy production (AEP) gain as a function of an average power from an AEP wind distribution and a reference power curve.

8. The method of claim 1, further comprising:
generating a first power distribution from a portion of at least one of the first or second sets of operating data;
generating a second power distribution from another portion of at least one of the first or second sets of operating data; and,
validating the one or more wind farm performance measurements by comparing the first and second power distributions.

9. The method of claim 1, further comprising determining whether the first and second sets of operating data are above a predetermined threshold sufficient to obtain a desired level of validation accuracy of the one or more wind farm performance measurements.

10. The method of claim 1, further comprising measuring the first and second sets of operating data via a plurality of sensors and using the sensor signals to generate the baseline graphical distribution and the upgraded graphical distribution.

11. A method for operating a wind farm, the method comprising:
installing one or more upgrades in the wind farm after evaluating performance of the one or more upgrades, wherein evaluating performance of the one or more upgrades comprises:
operating, via a controller, the wind farm in a baseline operating mode;
generating, via a processor, a baseline graphical distribution of performance of the wind farm based on operating data from the baseline operating mode;
providing one or more upgrades to at least one of the wind turbines in the wind farm;
operating, via the controller, the wind farm in an upgraded operating mode;
toggling between the baseline operating mode and the upgraded operating mode until a certain amount of operating data is collected for each of the operating modes;
generating, via the processor, an upgraded graphical distribution of performance of the wind farm based on operating data from the upgraded operating mode;
normalizing the baseline and upgraded graphical distributions by multiplying the first and second graphical distributions with normalization weights;
comparing, via the processor, the normalized baseline graphical distribution and the normalized upgraded graphical distribution;
wherein the normalization weights ($C_{Normalization}$) can be calculated based on an equation:

$$C_{Normalization} = \frac{N_{2CR} * X_{1CR}}{N_{1CR} * X_{2CR}} \cdot \frac{SUM(N_{1CR})}{SUM(N_{1CR})}$$

wherein $N_{1CR}$ and $N_{2CR}$ are power histogram counts from measured mean powers ($P_{1CR}$ and $P_{1CR}$) of first and second operation modes respectively and $X_{1CR}$ and $X_{2CR}$ are power histogram means from $P_{1CR}$ and $P_{2CR}$ histogram bins respectively, and controlling, via the controller, the wind farm with the plurality of upgrades installed in the wind farm after evaluating performance of the plurality of upgrades.

12. The method of claim 11, wherein the one or more wind farm performance measurements comprise a power output of the wind farm.

13. The method of claim 12, wherein the baseline graphical distribution and the upgraded graphical distribution comprise a baseline power histogram and an upgraded power histogram, respectively.

14. The method of claim 13, wherein comparing the baseline graphical distribution and the upgraded graphical distribution further comprises determining a difference between the baseline power histogram and the upgraded power histogram, wherein the difference is reflective of a change in the power output produced by the one or more upgrades.

15. The method of claim 11, further comprising generating a baseline wind distribution and an upgraded wind distribution and normalizing the baseline and upgraded graphical distributions based on the baseline and upgraded wind distributions.

16. A system for operating a wind farm, the system comprising:
a plurality of sensors configured to measure operating data from one or more wind turbines in a wind farm; and
a controller configured to install one or more upgrades in the wind farm after evaluating performance of the one or more upgrades based on one or more operations, the operations comprising:
operating the wind farm in a first operating mode;
collecting a first set of operating data daring the first operating mode;

operating the wind farm in a second operating mode;
collecting a second set of operating data during the second operating mode;
toggling between the first and second operating modes until a certain amount of operating data is collected for each of the first and second sets of operating data;
normalizing the first and second sets of operating data based on wind speed distributions;
comparing the normalized first and second sets of operating data so as to validate one or more wind farm performance measurements;
generating a first graphical distribution of performance of the wind farm from the first set of operating data and generating a second graphical distribution of performance of the wind farm from the second set of operating data;
wherein normalizing the first and second sets of operating data comprises multiplying the first and second graphical distributions by normalization weights;
wherein the normalization weights ($C_{Normalization}$) can be calculated based on an equation:

$$C_{Normalization} = \frac{N_{2CR} * X_{1CR}}{N_{1CR} * X_{2CR}} \cdot \frac{SUM(N_{1CR})}{SUM(N_{1CR})}$$

wherein $N_{1CR}$ and $N_{2CR}$ are power histogram counts from measured mean powers ($P_{1CR}$ and $P_{2CR}$) of first and second operation modes respectively and $X_{1CR}$ and $X_{2CR}$ are power histogram means from $P_{1CR}$ and $P_{2CR}$ histogram bins respectively; and controlling, via a farm controller, the wind farm with the plurality of upgrades, installed in the wind farm after evaluating performance of the plurality of upgrades.

17. The method of claim 1, wherein the plurality of upgrades includes at least one of rotor blade chord extensions, hardware upgrades, wake controls, aerodynamic upgrades, blade tip extensions, vortex generators and winglets upgrades.

* * * * *